United States Patent
Kreuzer et al.

(10) Patent No.: US 7,267,305 B2
(45) Date of Patent: Sep. 11, 2007

(54) CARRYING DEVICE HAVING TUBULAR MEMBER FOR SUPPLY LINES

(75) Inventors: Friedhelm Kreuzer, München (DE); Heinrich Röder, Ismaning (DE)

(73) Assignee: Trumpf Kreuzer Medizin Systeme GmbH + Co.KG, Pucheim (DE)

( * ) Notice: Subject to any disclaimer, the term of this patent is extended or adjusted under 35 U.S.C. 154(b) by 249 days.

(21) Appl. No.: 10/432,489

(22) PCT Filed: Nov. 19, 2001

(86) PCT No.: PCT/EP01/13367

§ 371 (c)(1),
(2), (4) Date: May 21, 2003

(87) PCT Pub. No.: WO02/42680

PCT Pub. Date: May 30, 2002

(65) Prior Publication Data

US 2004/0026589 A1    Feb. 12, 2004

(30) Foreign Application Priority Data

Nov. 21, 2000   (DE)   ................. 100 57 556

(51) Int. Cl.
*F16L 3/00* (2006.01)
*E04B 2/00* (2006.01)
*H02G 3/08* (2006.01)

(52) U.S. Cl. ............... 248/49; 52/287.1; 174/481

(58) Field of Classification Search .......... 248/343, 248/282.1; 52/220.5, 288.1, 287.1; 174/48, 174/135, 95, 481
See application file for complete search history.

(56) References Cited

U.S. PATENT DOCUMENTS

| | | | | |
|---|---|---|---|---|
| 3,546,360 A | * | 12/1970 | Bailey | .............. 174/48 |
| 3,786,171 A | * | 1/1974 | Shira | .............. 174/48 |
| 4,534,147 A | * | 8/1985 | Cristell | .............. 52/288.1 |
| 4,629,826 A | * | 12/1986 | Thomas | .............. 174/99 R |
| 4,646,211 A | * | 2/1987 | Gallant et al. | .............. 362/149 |
| 5,024,614 A | * | 6/1991 | Dola et al. | .............. 439/114 |
| 5,243,800 A | * | 9/1993 | Olbrich | .............. 52/287.1 |
| 5,274,972 A | * | 1/1994 | Hansen | .............. 52/220.5 |
| 5,490,652 A | * | 2/1996 | Martin | .............. 248/282.1 |
| 5,618,090 A | * | 4/1997 | Montague et al. | .............. 312/209 |
| 5,728,976 A | * | 3/1998 | Santucci et al. | .............. 174/135 |
| 5,756,933 A | * | 5/1998 | Pitchford et al. | .............. 174/48 |
| 5,966,760 A |   | 10/1999 | Gallant et al. | .............. 5/658 |
| 5,971,509 A | * | 10/1999 | Deimen et al. | .............. 312/223.6 |
| 6,084,180 A | * | 7/2000 | DeBartolo et al. | .............. 174/95 |
| 6,107,575 A | * | 8/2000 | Miranda | .............. 174/101 |

(Continued)

FOREIGN PATENT DOCUMENTS

| | | |
|---|---|---|
| DE | 83 04 407.8 | 6/1983 |
| DE | 43 11 374 A1 | 10/1994 |
| DE | 197 48 480 A1 | 5/1999 |

*Primary Examiner*—Anita M. King
(74) *Attorney, Agent, or Firm*—George W. Neuner; Edwards Angell Palmer & Dodge LLP

(57) ABSTRACT

A tripod head (5, 5') is provided for a support for a supply device for patients, with an elongated supply part (10, 10') with feeds (11, 12) of supply lines and a carrying device (13, 13', 14, 14', 16, 19) attached to the supply part for carrying appliances. The carrying device is adjustable in position on the supply part.

15 Claims, 9 Drawing Sheets

U.S. PATENT DOCUMENTS 6,191,363 B1 * 2/2001 Samuels .................... 174/68.3
6,513,289 B1 * 2/2003 Decore et al. ............. 52/288.1
6,557,311 B1 * 5/2003 Mongelli ................... 52/288.1
6,835,891 B1 * 12/2004 Herzog et al. ................ 174/66

RE38,709 E * 3/2005 Gutgsell et al. ......... 108/50.02
6,903,265 B1 * 6/2005 VanderVelde et al. ........ 174/48
6,972,367 B2 * 12/2005 Federspiel et al. ............ 174/48

* cited by examiner

CARRYING DEVICE HAVING TUBULAR MEMBER FOR SUPPLY LINES

CROSS-REFERENCE TO RELATED APPLICATIONS

Not applicable

STATEMENT REGARDING FEDERALLY SPONSORED RESEARCH OR DEVELOPMENT

Not applicable

NAMES OF PARTIES TO A JOINT RESEARCH AGREEMENT

Not applicable

INCORPORATION-BY-REFERENCE OF MATERIAL SUBMITTED ON A COMPACT DISC

Not applicable

BACKGROUND OF THE INVENTION (1) Field of the Invention

The invention relates to a tripod head, in particular for a medical monitoring and supply device, a carrier profile for such a tripod head and an appliance trolley.

(2) Description of Related Art

Medical monitoring and supply devices are known comprising a ceiling support with a tripod head attached thereto, which carries medical appliances and suchlike and via which feeds for electricity, gas, etc. are fed to the appliances. Equipping with appliances differs in the size of appliance and also in the number of appliances to be used. In order to enable variability in equipping with appliances, tripod heads of this kind are often of large dimensions. However, in general there is little space available in rooms for diagnosis and therapy of seriously ill patients.

BRIEF SUMMARY OF THE INVENTION

It is the object of the invention to provide an improved tripod head, in particular for a medical monitoring and supply device, with which, in particular, space can be saved.

The invention provides a tripod head for a tripod, in particular for a supply device for patients, with a supply part (10, 10') with feeds of supply lines (100) and a carrying device (13, 13', 14, 14', 16; 19, 120) attached to the supply part (10, 10') for carrying appliances, characterised in that the carrying device is adjustable in position on the supply part.

The invention also provides a carrier profile for a carrying device, in particular for a medical supply device with a first profile section (14a) and a second profile section (14b) running at an angle to it, wherein the second profile section (14b) has a duct (15, 15') for accommodating supply lines or suchlike and wherein a cover (90) is provided for closing the duct.

Tripod head in accord with various embodiments of the invention can include one or more of the following features:

(a) the carrying device has at least one carrier element (13, 13', 14, 14', 19) extending vertically to the supply part and attached displaceably to the supply part;

(b) the carrying device has at least two carrier elements (13, 13', 14, 14', 19) extending vertically to the supply part, the distance of which from one another is adjustable;

(c) the supply part (10, 10') is constructed as an elongated housing, having on its upper side and/or its lower side grooves running in the longitudinal direction in which the carrier elements are displaceable;

(d) the supply part has an upper profile (21), connected to a lower profile (45), enclosing between them a duct-shaped space for accommodating supply lines and connections, wherein the grooves are provided on the side of the upper profile or the lower profile facing away from the space;

(e) the groove is constructed as a T-groove (22, 22', 46, 46');

(f) the upper profile (21) and the lower profile (45) are connected to one another via an element (57, 57') attached as swivellable to the lower profile, to which connecting elements for the feeds or connections (11, 12) or suchlike are attached;

(g) the element (57, 57') is removable;

(h) connections (11) for the supply lines are provided on individual hoops (60), which are removably fixed to the element (57, 57');

(i) the upper profile (21) and the lower profile (45) have in each case on their side facing the other profile in each case a profile groove (27, 27', 47, 47') for inserting holding or insulating sheets (29);

(j) the supply part (10, 10') is fixed to the tripod (1) via the groove (22, 22') to which the carrier elements are fixed and is adjustable in position on the tripod; and (k) openings (39, 39', 40) are provided in the supply part for guiding through cables and/or lines.

Carrier profiles in accord with various embodiments of the invention can include one or more of the following features:

(1) the cover (90) is fixed as swivellable on one side of the second profile section (14b);

(2) the cover (90) is removable;

(3) a sealing lip (91, 92) is provided between the cover and the border of the second profile section;

(4) a holding device (93, 94) is provided inside the duct for holding and guiding the supply lines;

(5) the holding device has at least three curved holding teeth (93, 94) located next to one another;

(6) the middle tooth has a catching cam (95) into which a cam (96) provided on the cover at an appropriate point engages;

(7) in the angle between the first and the second profile sections a groove (89) is provided for fixing carrying parts (16) running crosswise to the carrier profile;

(8) two such carrier profiles (14, 14') are connected to one another via consoles (16) running crosswise thereto for carrying appliances and/or ducts (17) for to form a stand;

(9) the crosswise-running ducts (17) have a swivellable cover (113);

(10) the ducts (17) have a holding device (110, 111, 112) for holding the lines; and

(11) the ducts (17) and/or the cover have sealing lips (115, 116).

In another embodiment the invention provides a tripod head with at least two carrier profiles as described herein, wherein on the carrier profiles (14, 14') at least one console (16) extending crosswise thereto is provided for accommodating appliances or suchlike and wherein the stand formed by the carrier profiles and the consoles is attached to the supply device (10). In various embodiments, the support head is constructed as described herein.

The invention also provides an appliance trolley, in particular for accommodating medical appliances, with an undercarriage (131) and at least two carrier profiles mounted thereon, wherein at least one console (16) extending crosswise thereto for carrying appliances is provided on the carrier profiles (14, 14'). In various embodiments, a pull-out drawer (133) for accommodating line feeds (134, 136) is provided below the undercarriage.

Further features and advantages of the invention emerge from the description of embodiment examples using the figures.

BRIEF DESCRIPTION OF THE SEVERAL VIES OF THE DRAWINGS

FIG. 5 shows a partially sectional side view of the infusion tripod head of FIG. 1a.

DETAILED DESCRIPTION OF THE INVENTION

Figure 1:
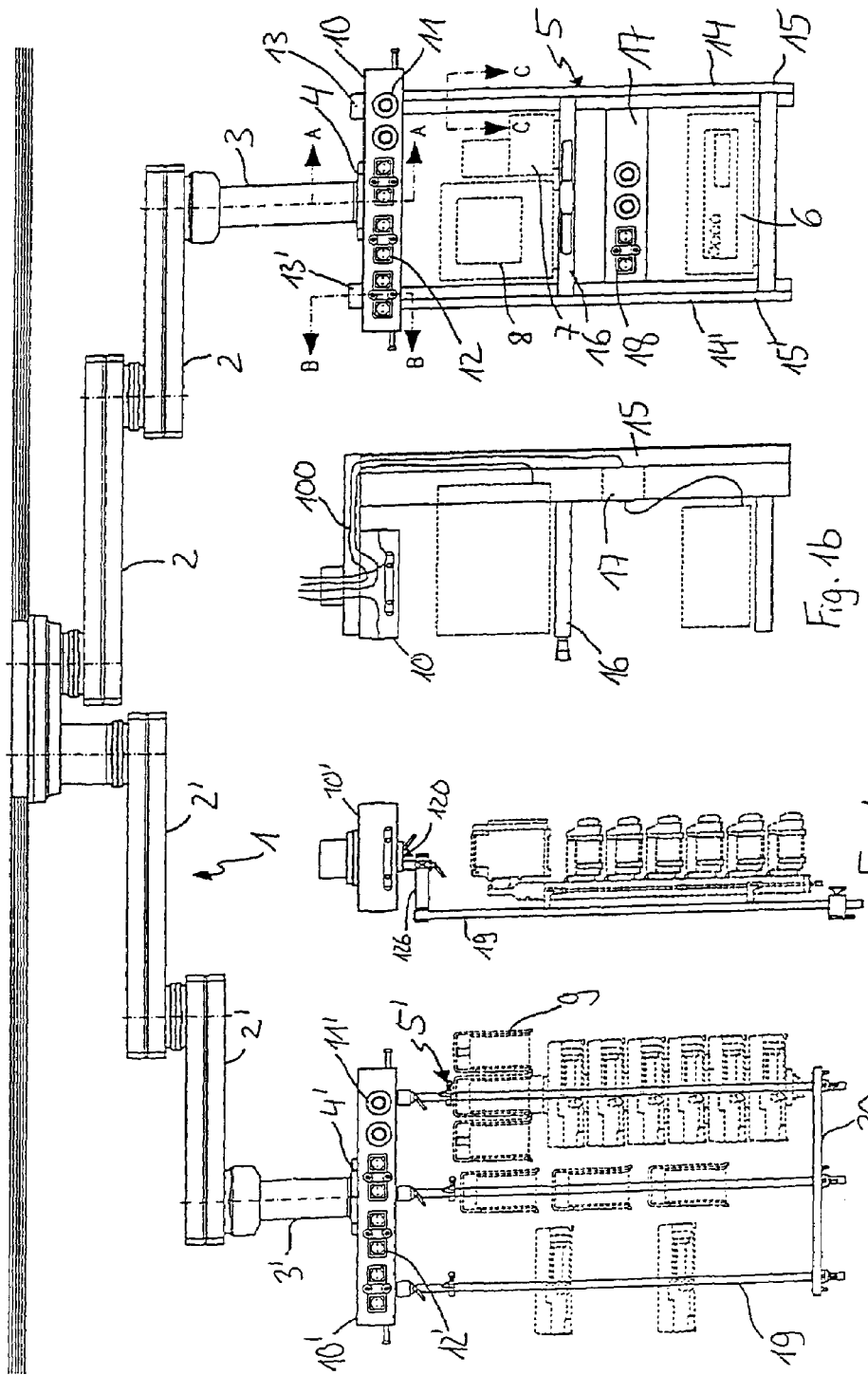
FIG. 1a shows a schematic front view of a medical monitoring and supply device.
FIG. 1b shows a schematic view of the monitoring and respiration tripod head of FIG. 1a seen from the side.
FIG. 1c shows a schematic illustration of the infusion support head of FIG. 1a seen from the side.

FIG. 1a shows a ceiling support 1 with carrying columns 3, 3' carried on swivel arms 2, 2'. On each carrying column 3, 3' a tripod head 5, 5' is arranged, via a pivot bearing plate 4, 4', as appliance carrier and supply unit for appliances stored thereon or appliances clamped thereto. A first tripod head 5 is constructed as a monitoring and respiration tripod head for carrying appliances 6, 7, 8 placed thereon, such as, for example, a monitoring monitor, a computer, a display appliance and a respiration appliance. A second tripod head 5' is constructed as an infusion support head for clamping on appliances, such as, for example, infusion or injection pumps 9. Each support head 5, 5' comprises a supply part 10, 10', connected to the carrying column 3, 3' via the pivot bearing plates 4, 4'. The supply part 10, 10' contains supply lines, such as tubes and cables 100 which are supplied via the swivel arms 2, 2' and the carrying column 3, 3' constructed as a support tube for supplying the appliances carried by the support head or standing on the floor in the immediate vicinity with medical gases, media, electric current, data, etc. The supply part 10, 10' also contains the necessary connections for the greatest variety of products, such as gas connections 11, 11' for medical gases, electrical connections (strong and weak current) 12, 12' and data transmission connecting elements. The supply part is constructed as an elongated housing and mounted above head height on the carrying column.

The monitoring and respiration support head 5 has two horizontally aligned cross arms 13, 13', fixed to the upper side of the supply part 10 symmetrically to the carrying column 3, 3' and formed from a U-shaped profile, as well as two vertical carrier profiles 14, 14' with ducts 15, 15', attached to the cross arms 13, 13'. Horizontally running consoles 16 and/or blocks of drawers or keyboards for placing appliances on and for storing accessories, etc. are fixed to the carrier profiles 14, 14'. Between the carrier profiles 14, 14' horizontal ducts 17 are further provided to guide the lines, preferably with additionally built-in appliance connections, sockets and/or connecting elements 18.

The infusion tripod head 5' has on the underside of the supply housing 10' vertical tubes 19 as pump rods for clamping on infusion and/or injection pumps 9 or an infusion system consisting of pumps of this kind. Preferably several pump rods 19 are connected to one another at a distance from the supply part 10 via a standardised appliance rail 20 to increase the stability of the system. The pump rods 19 are horizontally adjustable in position, as described later.

Figure 2:
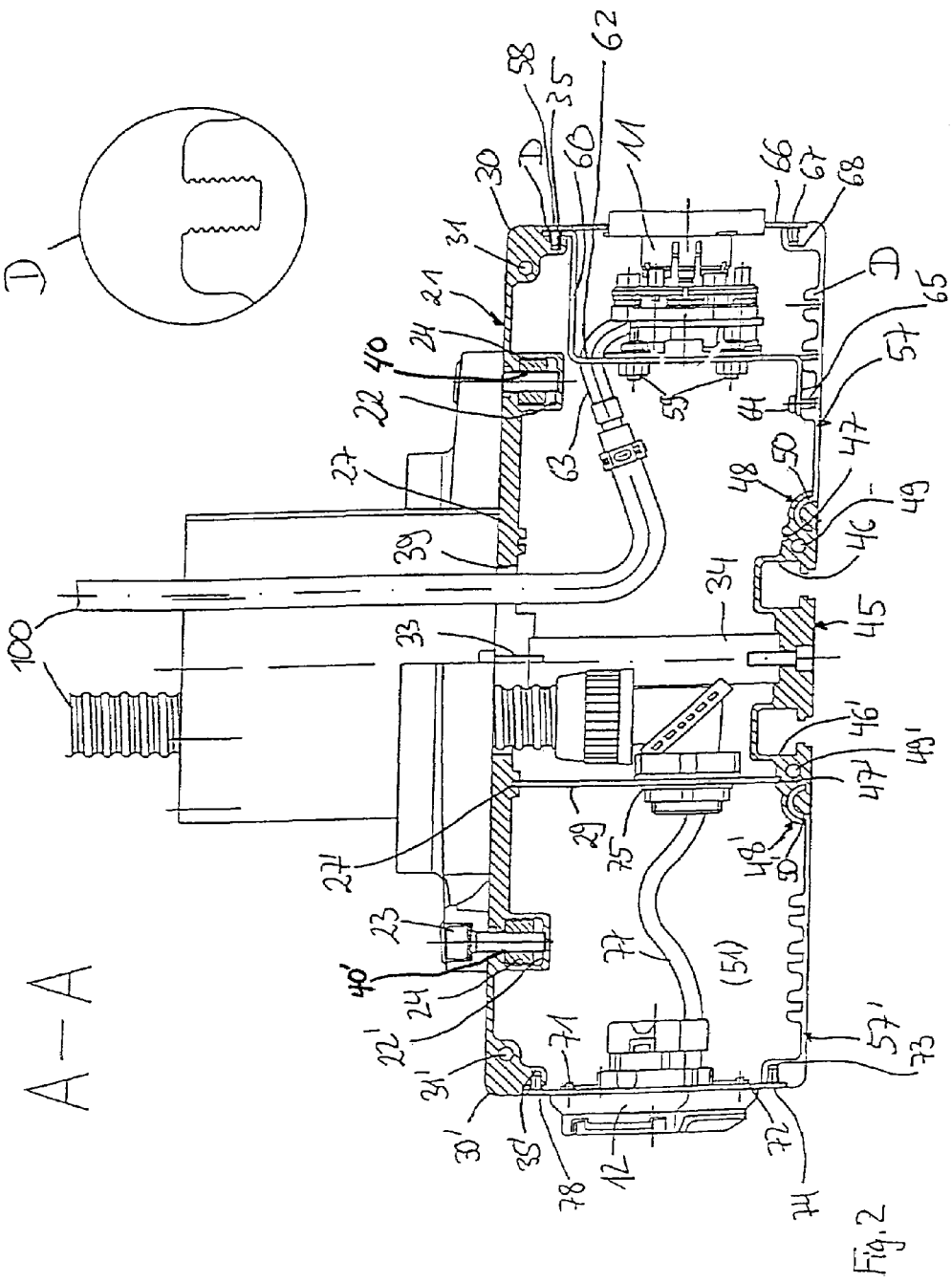
FIG. 2 shows a section through the supply part of the support head of FIG. 1a along line A-A.
Figure 3:
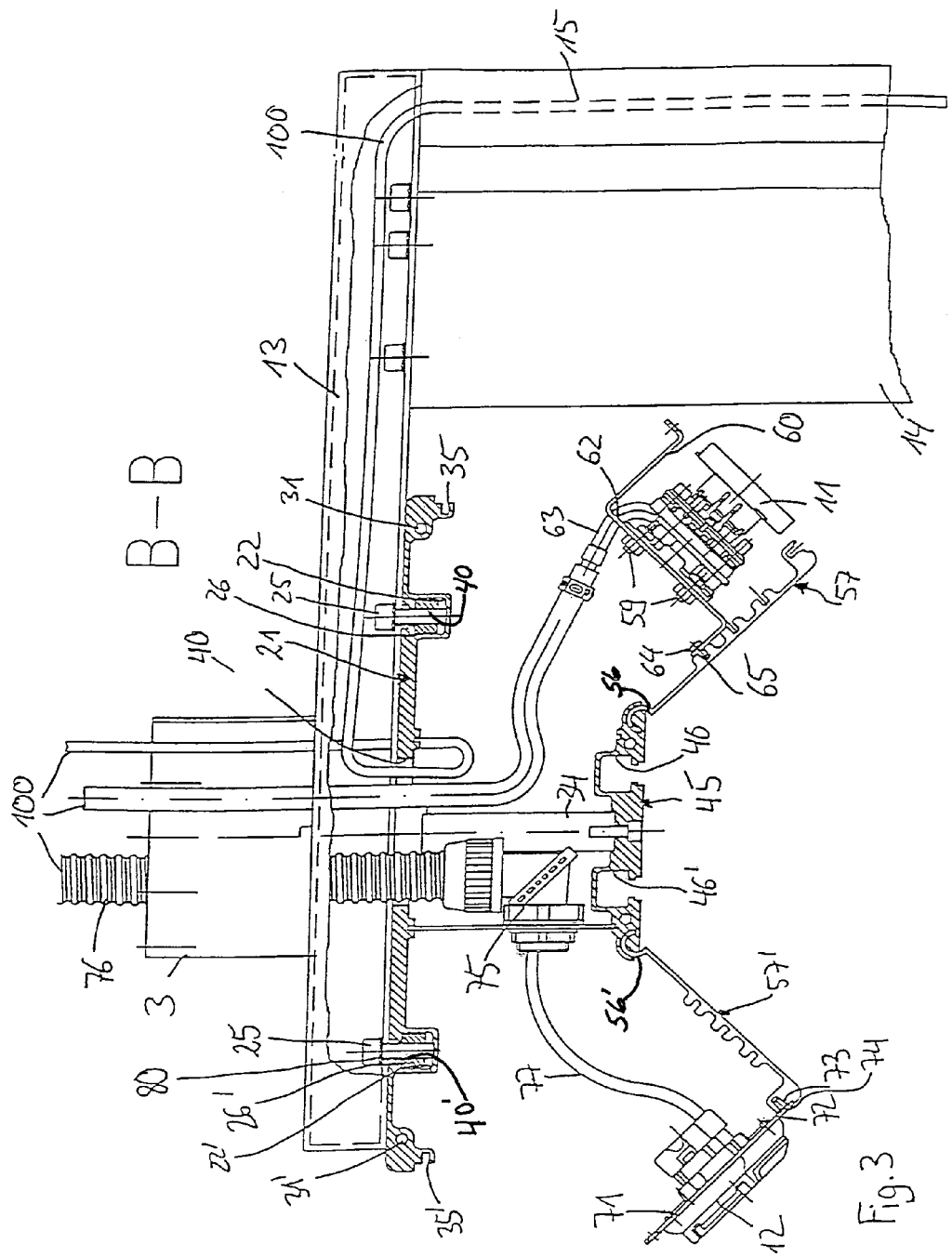
FIG. 3 shows a section through the supply part according to FIG. 1a along line B-B in the open state.
Figure 4:
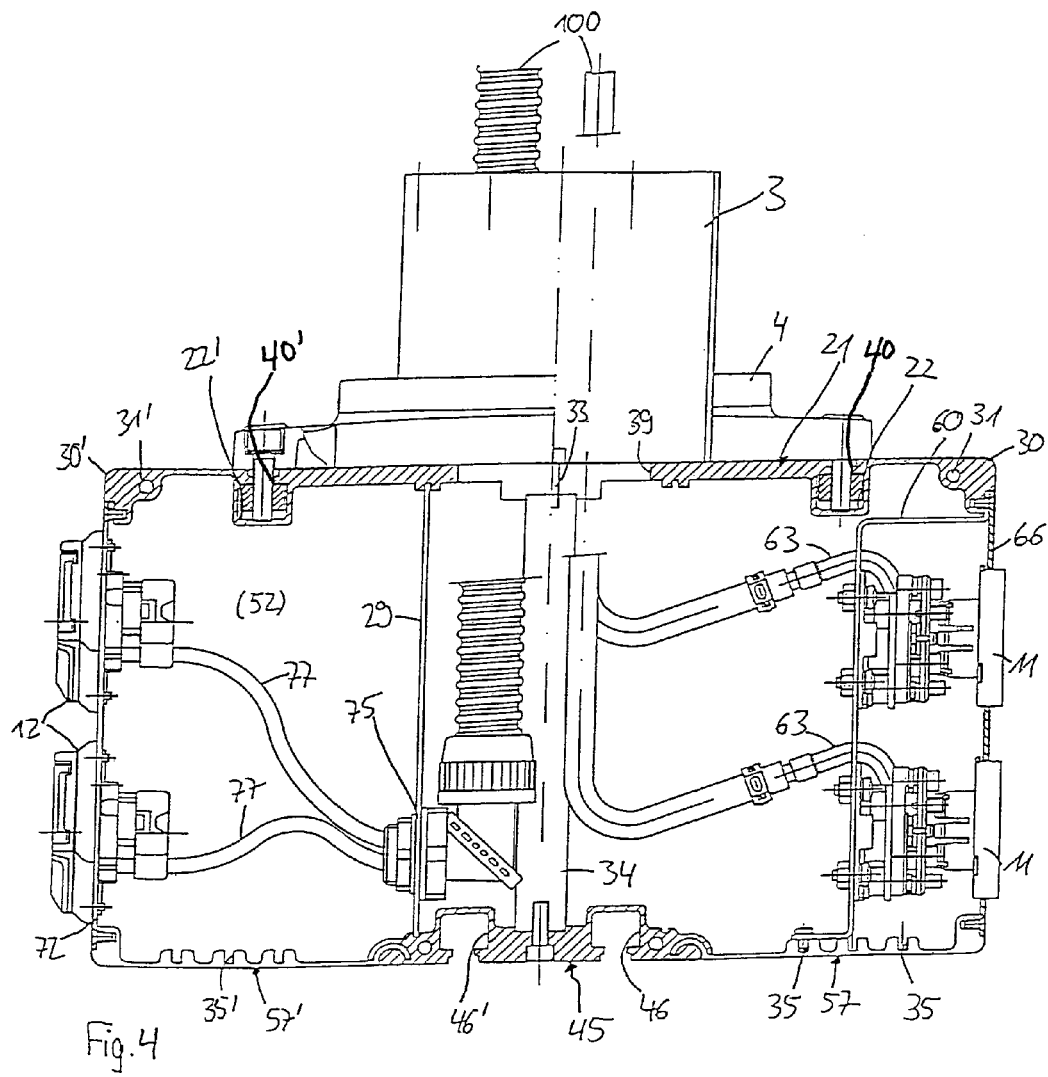
FIG. 4 shows a section through the supply part according to FIG. 1a along line A-A in the closed state.
Figure 5:
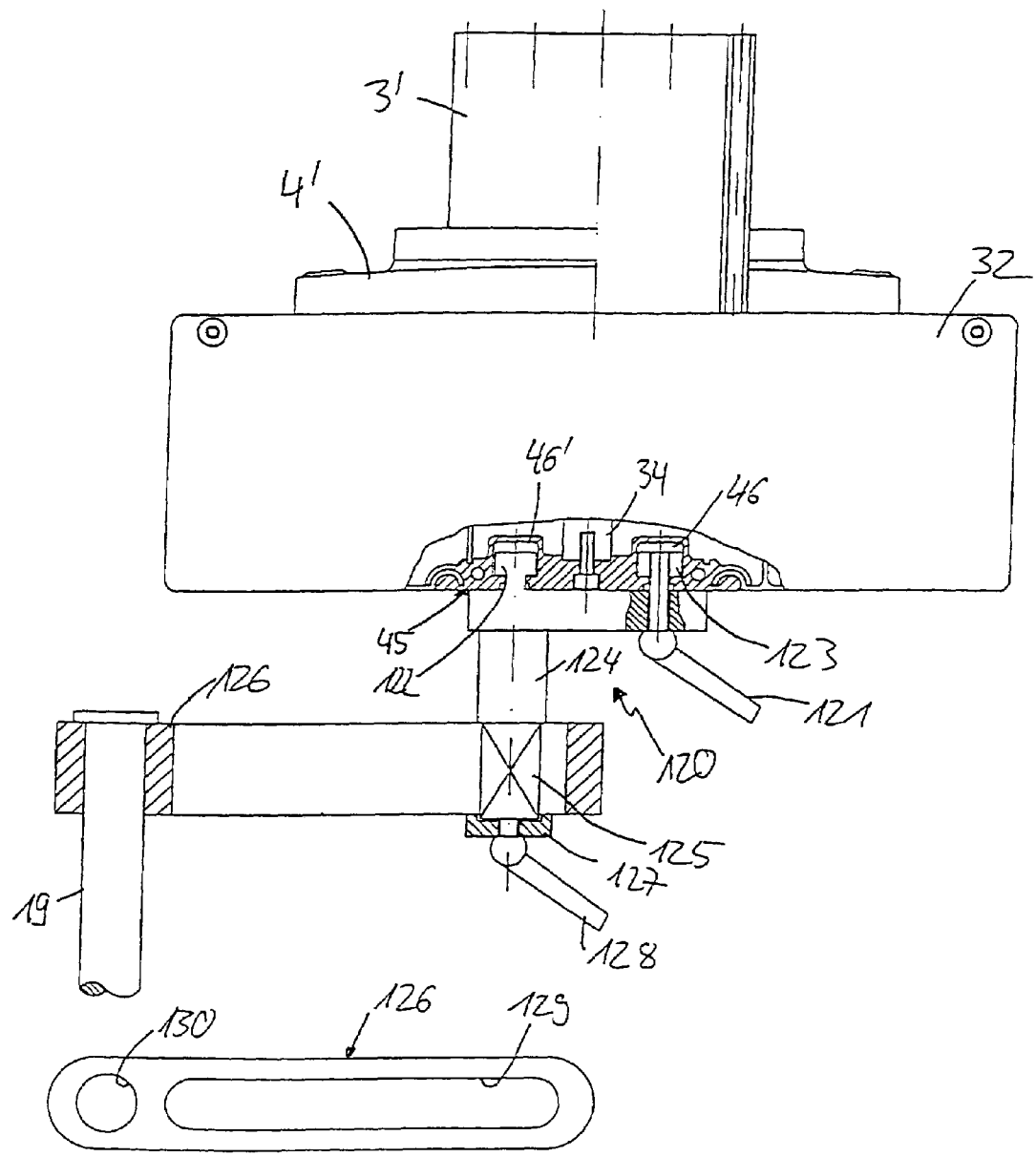

As can be seen from FIGS. 2 to 5, the supply part 10, 10' is constructed as a housing, consisting of an upper profile 21 and a lower profile 45 with a substantially rectangular contour, connected to one another via spacing pins 34 of square cross-section. The lower profile 45 has the same length as the upper profile, but a smaller width. Depending on the number of built-in connections 11, 12, the supply part 10 is constructed as single-duct (51), as illustrated in FIG. 2, or dual-duct (52), as illustrated in FIG. 4, by the corresponding length of the spacing pins 34. Depending on the length of the supply part 10, 10' a corresponding number of spacing pins 34 is provided in the longitudinal direction.

The upper profile 21 has on its outer side at a distance from the profile edges 30, 30' in the longitudinal direction a pair of parallel running T-grooves 22, 22'. The supply part 10, 10' is fixed to the pivot bearing plate 4, 4' by means of screws 23 and groove nuts 24 inserted into the respective T-groove 22, 22', as can be seen in particular from FIGS. 2 and 4 and 8. As can be seen in particular from FIGS. 3 and 8, each cross arm 13, 13' is further fixed to the upper profile 21 by means of screws 25 and nuts 26 inserted into the respective T-groove 22, 22'. The lower profile 45 has on its side facing away from the upper profile 21 a pair of T-grooves 46, 46' running parallel to the profile edges 48, 48' for fixing the pump rods 19.

The upper profile 21 and the lower profile 45 have on their inner sides facing one another opposite pairs of grooves 27, 47 or 27', 47', provided at a distance from the respective profile edges and serving for inserting insulating or holding sheets 29. The upper profile 21 and the lower profile 43 further have in each case near their profile edges 30, 30' or 48, 48' a pair of threaded ducts, 31, 31' in the upper profile or 49, 49' in the lower profile, for screwing on housing side parts 32, 32', as can be seen in particular from FIGS. 5 and 8.

The upper profile 21 contains on its opposite outer borders of the profile edges 30, 30' in each case a threaded profile 35, 35', illustrated in particular in FIG. 2 as detail D, for fixing front plates 66. The upper profile 21 further has in its centre a central recess 39, which corresponds in shape and size to the opening in the pivot bearing plate 4, 4', and at a distance from this central recess 39 two further recesses 40, 40', as can be seen in particular from FIG. 3. The position of the attached cross arms 13, 13' corresponds approximately to the position of the recesses and therefore ultimately to the width of the consoles 16 built in between the carrier profiles 14, 14'. Further provided in the centre of the upper profile 21 is a groove 33 which prevents twisting of the spacing pins 34 and thus serves to simplify assembly.

The lower profile 45 has in each case on the opposite profile edges 48, 48' a profiled hinge part 50, 50' for linking swivel chassis 57, 57', as can be seen in particular from FIGS. 2 and 3. The swivel chassis 57, 57' are constructed as profile parts, the length of which corresponds to the length of the lower or upper profile. On their border facing the lower profile in the assembled state they have corresponding opposite pieces 56, 56' for cooperating with the hinge parts 50, 50' of the lower profile. The swivel chassis serve to accommodate connections 11, 12 and connecting elements, such as, for example, IT connecting elements including the appropriate front plates 66.

FIGS. 2 to 4 show in their right half swivel chassis 57, which serves to accommodate gas connections 11 or gas sockets. Each gas socket is screwed on its rear side with screws 59 to an adaptation hoop 60, which has specific socket-side fixing holes and a recess 62 for a connecting tube 63 for the type of socket in question. The adaptation hoops 60 located next to one another are fixed by means of screws 64 to threaded profiles 65, facing inwards in the assembled state, of the profile part of swivel chassis 57. Swivel chassis 57 is further connected to the upper profile 21 via the adaptation hoops 60 by means of screws 58 in the threaded duct 35 of the upper profile 21. Each connection 11 is further covered by the front plate 66 appropriate to this type of connection, which front plate 66 is connected by screws 67 in a threaded duct 68 on the outer border of the swivel chassis 57 to the latter and to the upper profile in the threaded duct 35 of the upper profile by means of corresponding recesses in the adaptation hoop. The swivel chassis 57, together with the adaptation hoops 60, maintains the required stability.

In the left half of FIGS. 2 to 4 swivel chassis 57' is illustrated, which serves to accommodate the electrical connections 12. Swivel chassis 57', like swivel chassis 57, is constructed as a profile part and has on its outer border a threaded duct 73. A front plate 72 is further provided, with openings 71 for the electrical connections 12, and is connected to swivel chassis 57' via screws 74 cooperating with the threaded duct 73 of swivel chassis 57'. The electrical connections 12 are connected to cables 77 which are fed inside protective tubes 76, fixed to the insulating or holding sheet 29 by means of known angled screw fittings 75. The swivel chassis is connected to the upper profile via screws 78 engaging in the threaded duct 35' of the upper profile 21. In the closed state the supply part 10, 10' is thus rigid against twisting. The supply part 10, 10' can be used for the monitoring and respiration support head 5 in the same way as for the infusion support head 5'. Depending on the appliances used in the support head the corresponding type and number of gas connections 11 or electrical and data connections 12 is provided.

Figure 6:
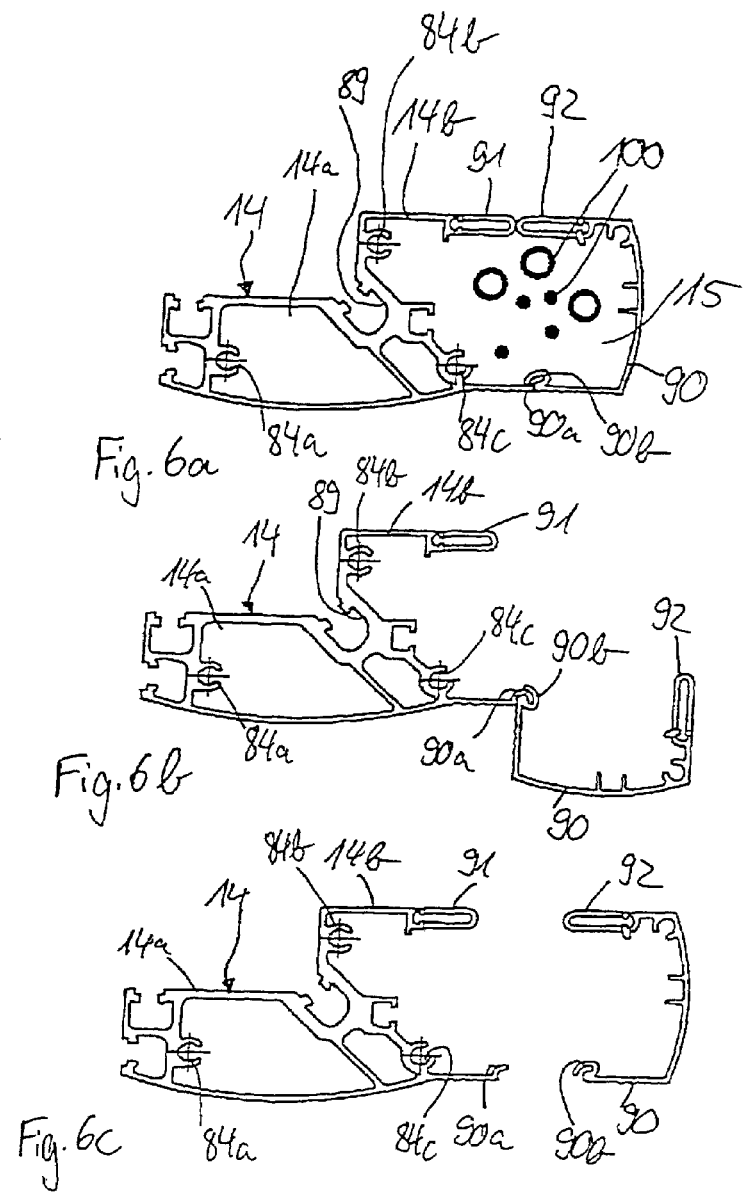
FIG. 6a shows a section through the carrier profile of the tripod head of FIG. 1a along line C-C with closed duct.
FIG. 6b shows a section through the carrier profile of the tripod head of FIG. 1a along line C-C with open duct.
FIG. 6c shows a section through the carrier profile of the tripod head of FIG. 1a along line C-C with open duct with the cover of the cable duct removed.

The construction of the monitoring and respiration support head is described in greater detail below. The cross arms 13, 13' are constructed as U-profiles. The length of the cross arms corresponds to the width of the supply part 10 when swivel chassis 57 is open with the addition of approximately the width of carrier profile 14 including ducts 15. As can be seen in particular from FIGS. 3 and 8, each cross arm has on its lower side facing the supply part 10 holes 80 for screws 81, which are connected to the groove nuts 26, 26' located in the pair of T-grooves 22, 22' of the upper profile 21. The lower side further contains an opening 82 flush with the recesses 40, 40' of the upper profile. The cross arms are fixed on the upper profile 21 in such a way that one end of each cross arm occludes flush with the front side of the supply part and the other end projects above the supply part. The vertical carrier profile is fixed to the projecting part. Each cross arm has on its end facing the carrier profile 14 a recess 83 open starting from this end for guiding through the lines emerging from the recess 40, 40' of the supply part 10 into ducts 15, 15' of carrier profiles 14, 14'. The carrier profiles 14, 14' have on their ends facing the cross arms 13, 13' threaded ducts 84a, 84b, 84c (FIGS. 6a to 6c), via which, by means of screws 85 cooperating therewith, the carrier profiles 14, 14' are connected in each case to the cross arms 13, 13'. The cross arms 13, 13' have on their side facing away from the supply part a cover 86 which can be fixed by clipping on.

As can be seen from FIGS. 6a to 6c and FIG. 7, the carrier profiles 14, 14', which serve as vertical fixing profiles for the consoles, blocks of drawers, etc., are formed from an angled profile comprising a first section 14a and a second section 14b, running at an angle to it, both of which are constructed as hollow profiles. In the angle between the first section 14a and the second section 14b runs a groove 89 for inserting groove sliding blocks, not shown, and for fixing consoles, etc. The first section 14a is constructed as a closed hollow profile and the second section 14b as an open hollow profile forming a duct 15 for lines 100 running therein (cables and gas lines), which is closed with a profile-type cover 90, which can be unhinged. The second section 14b has for this purpose on an outer edge a hinge part 90a which cooperates with a corresponding opposite part 90b of the cover 90. The edges of the cover 90 and the second section 14b of the angled profile facing one another have in each case a hollow sealing lip 91, 92, which when the duct 15, 15' is closed elastically enclose the lines 100 leading out of it at any chosen height and containing tubes and cables, for direct connection of appliances and therefore prevent penetration of foreign bodies into the duct 15, 15'.

In the inside of each duct 15, 15' at least three holders 93 are arranged, located next to one another in the manner of a ridge and curved into a basin shape, in which the lines 100 are guided and if applicable fixed with binders. The middle 94 holder has on the outer side of the basin an elastic catching cam 95, into which a corresponding second cam 96, profiled on to the cover 90, engages and keeps the cover closed. To open it the elastic holder 94 containing the catching cam 95 has to be inserted by means of a tool through the gap between the sealing lips 91, 92 into the inside of the duct, so that the cam 96 of the cover is released. The holders 93 are clipped on to profiles located on the inside of the duct.

Figure 7:
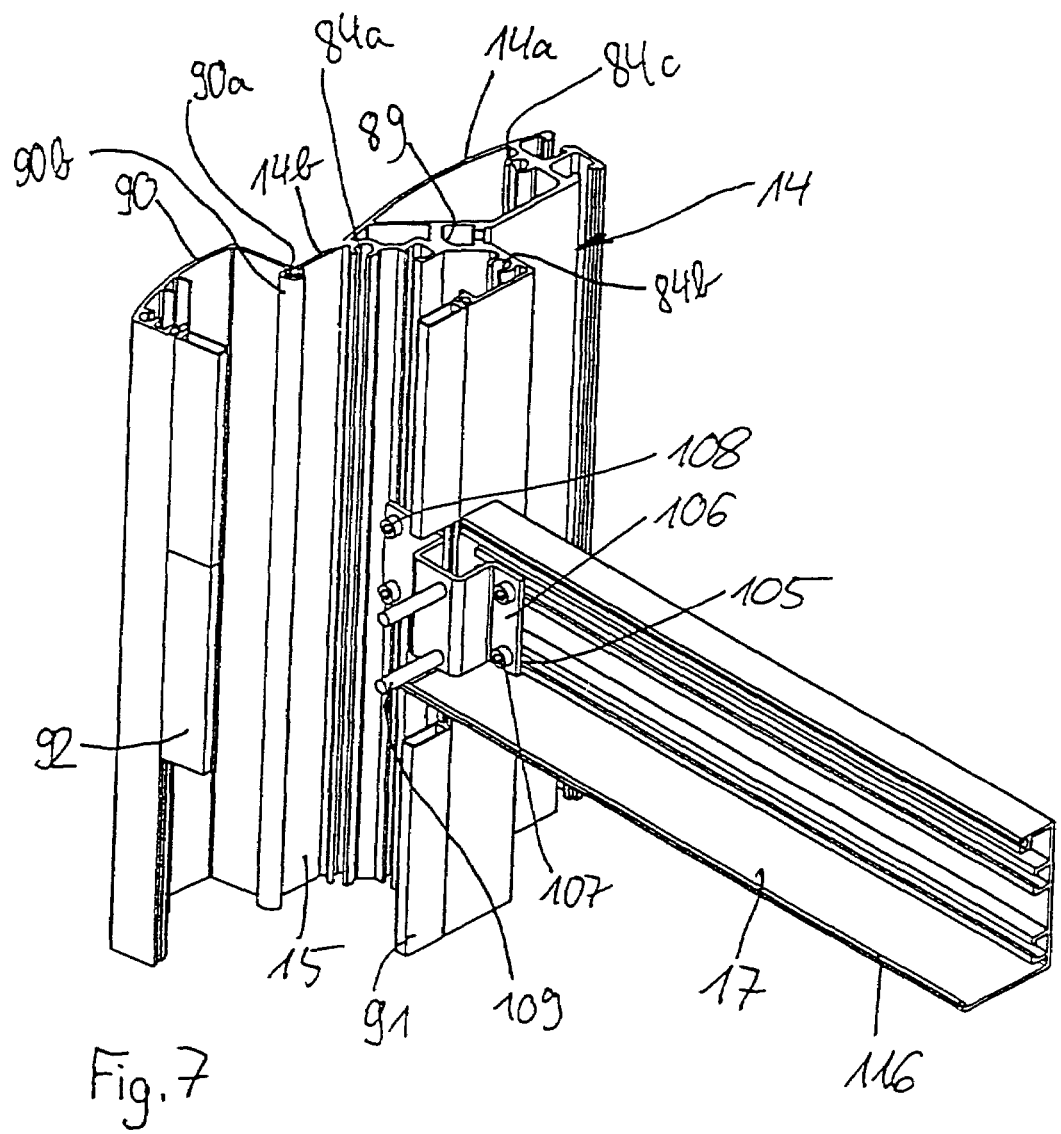
FIG. 7 shows a perspective illustration of the carrier profile according to the invention with open cover of the duct.
Figure 8:
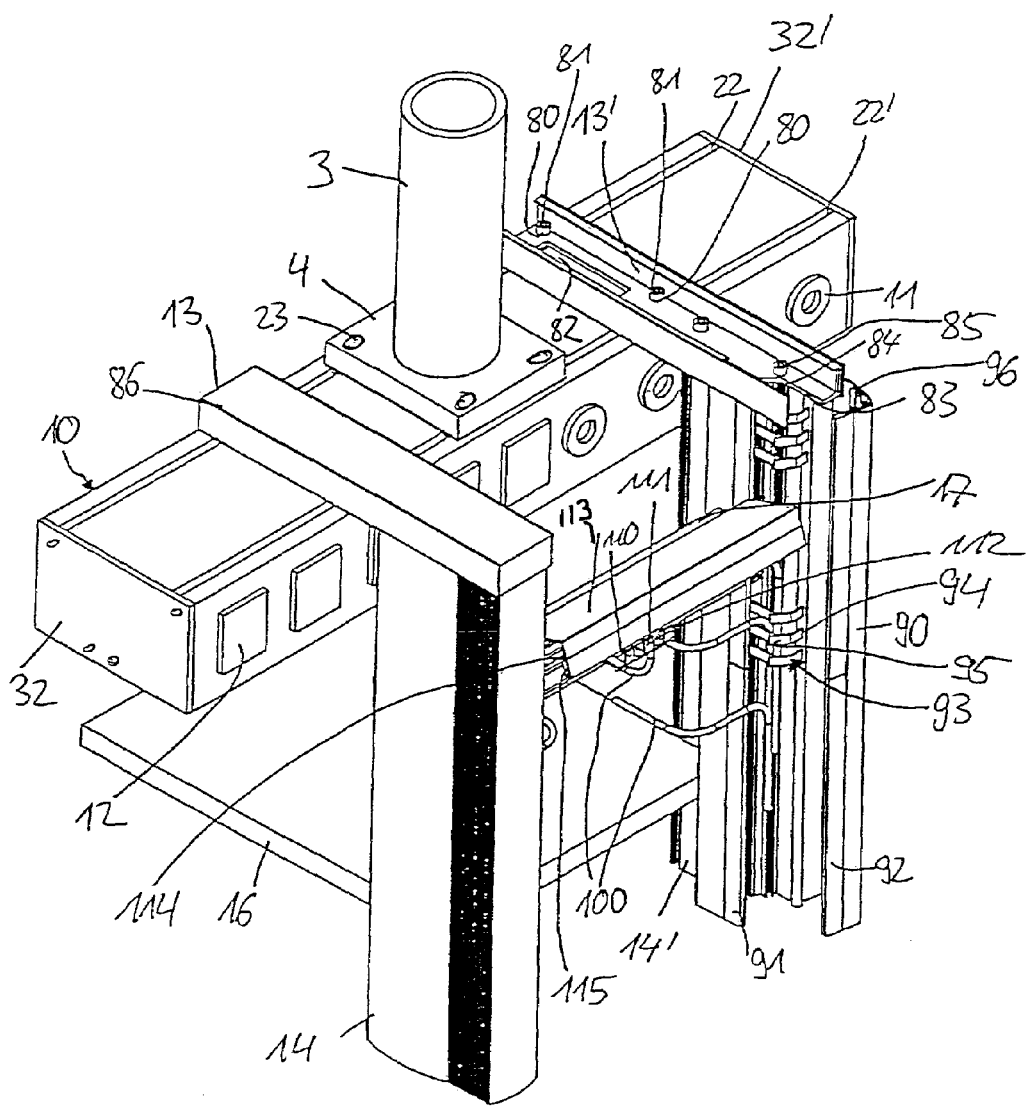
FIG. 8 shows a perspective illustration of part of the support head of FIG. 1a with open cover of the duct of the carrier profile.

As can be seen in particular from FIGS. 7 and 8, between the carrier profiles 14, 14' at any chosen height one or more horizontal ducts 17 are mounted and with hoops 106, each of which is connected by means of screws in groove nuts 107 located with corresponding T-grooves in a duct 105 of the duct 17 and by means of groove nuts 108 of ducts 15, 15' located in T-ducts. Out of each hoop 106 project two pins 109 for guiding the lines. Ducts 17, like ducts 15, are provided with a removable cover 113 which can be swivelled open and shut. In the inside of duct 17 are one or more groups of holders 110, located next to one another in the manner of a ridge and curved inwards in a basin shape, similar to holders 93, in which the lines are guided and if applicable fixed with binders. The middle holder 111 again has an elastic catching cam 112 into which a cam 114 profiled on the cover 17a engages and keeps it closed. The duct 17 is closed by the profile-like cover 113. Both the cover and the profile edge each contain a profile-like sealing lip 115, 116, which, when the cover 113 is closed, elastically enclose the lines leading out of duct 105, thus preventing penetration of foreign bodies into the duct. For opening, the catching cam 112 also has to be pushed backwards by a tool through the gap between the sealing lips, so that the cam of the cover is released. The horizontal ducts 17 have the advantage that, owing to the short exposed course of the cable between appliance and duct 17, a reduced outlay for cleaning is necessary and therefore more stable conditions of hygiene and more safety in respect of cable damage are provided.

The infusion support head 5' is described below. As can be seen from FIG. 5, the infusion tripod head 5' has on the underside of the supply part 10 a holder 120 for accommodating the pump rods 19. The holder 120 has a welded groove sliding block 122 displaceable in the groove 46 of the lower profile and also a groove sliding block 123 connected thereto and displaceable in the second T-groove 46'. Groove sliding block 123 can be detached or fixed by means of a T-screw 121. The holder further has a vertical arm 124 connected to the groove sliding blocks, with a double-edged section 125 on its lower end, on which an arm 126 is guided. The arm 126 is clamped by a T-screw 128 via a pressure disc 127. The T-screw is secured against untwisting. The arm 126 has on its end facing the double edge a recess 129 in the form of an elongated hole, via which the arm is displaceable crosswise to the T-grooves 46. On its opposite end the arm 126 has a recess 130 through which the pump rod 19 is guided.

Because of the displaceability in the T-grooves 46, 46' of the lower profile and the displaceability of the pump rod 19 relative to the carrying arm 124, the pumps of the infusion tripod head 5' can be pushed towards one another at any chosen position. In this way the infusion system can be attached at variable distances for adapting to the size of the pump. Additionally, carrier profiles 14, 14' can be supplemented in the infusion tripod head alone or together with horizontal ducts 17, as with the tripod head 5, for guiding the cables or lines leading to the pumps or appliances.

Each pump rod 19 is adjustable in depth, so the pumps with their approximate centre of gravity can be brought into an imaginary lengthened axis of rotation of the tripod head 5', defined by the pivot bearing plate 4'. As no additional torque arises in this appliance position, a higher maximum load weight is achieved and in addition space is saved.

For operation of the supply device firstly for the monitoring and appliance tripod head 5 the swivel chassis 57 for the gas connections is hooked into the hinge and the connections 11 are inserted in the respective adaptation hoops 60. Equipping thus takes place in the open state of the supply part 10. Then the swivel chassis 57 is folded up and the adaptation hoop 60 screwed on by means of the screws 58 in the threaded ducts 35. Then the respective appropriate front plate 66 for each connection is screwed on. The swivel chassis 57' for the electrical connections is provided in the swivelled away state with the corresponding front plate for the respective corresponding electrical connection 12 and the necessary cable connections are produced. Then the swivel chassis 57' is folded up and by means of screws 78 which cooperate with the threaded ducts 35' of the upper profile connected to the upper profile 21. The lines guided out of the recesses 40, 40' of the supply part are inserted into ducts 15, 15' of carrier profiles 14, 14' and if applicable into the horizontal ducts 17 and guided out at the corresponding points, so only a short piece of open line remains between duct and appliance. The infusion tripod head is correspondingly provided with the necessary number of pump rods 19 with the corresponding pumps.

Because of the displaceability of the appliances or the appliance holders in the T-grooves of the supply part 10, adaptation to various widths of consoles 16 or appliances is possible. In this way, as a function of the appliances used, always the smallest space is made available. Even a few centimeters of space saving are of advantage.

The leads 100 are guided in ducts 15, 15' and are therefore not open. Via the horizontal ducts 17 it is further possible to supply lines at corresponding points without them being exposed over a fairly large space. This increases safety and hygiene.

Figure 10:
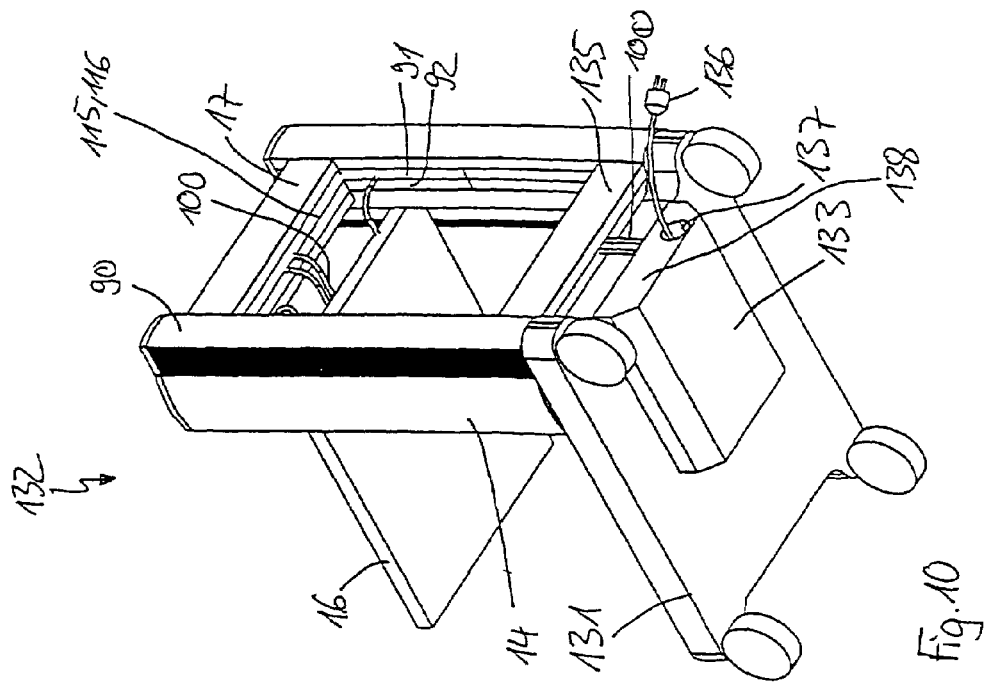
FIG. 10 shows a perspective illustration of the medical appliance trolley of FIG. 9 from below with closed cover of the duct.
Figure 9:
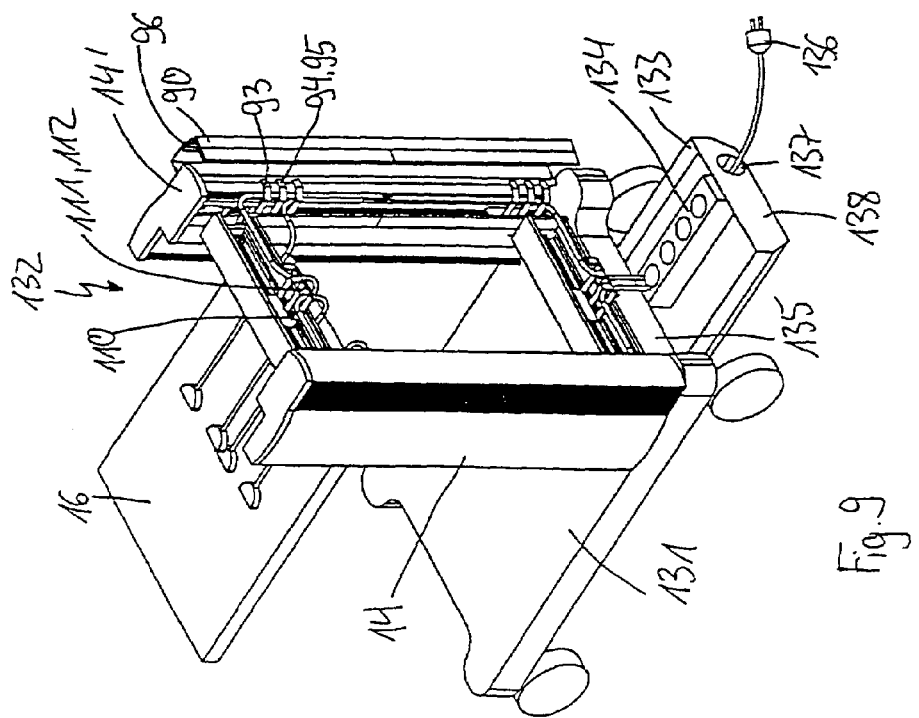
FIG. 9 shows a perspective illustration from above of a medical appliance trolley with the carrier profile according to the invention with open cover of the duct.

In a further embodiment of the invention, shown in FIGS. 9 and 10, the carrier profile 14, 14' according to the invention, with ducts 15, 15' is connected, alone or together with horizontal ducts 17 and the above-described consoles 16, blocks of drawers, etc., to an undercarriage 131, to which the carrier profiles 14, 14' are screwed. An appliance trolley 132 is thus formed. The width, height and depth and number of consoles, blocks of drawers, etc. can be freely chosen. On the underside of the undercarriage 131 a drawer 133 is provided, which from a functional point of view fulfils part of the object of the supply part 10 of the support head. The drawer 133 has, for example, a mains distributor 134, a separating transformer and a potential compensating bar and other things. Immediately above the drawer 133 a horizontal duct 135 is provided, into which the cables 100 issuing from the drawer 133 enter and are guided via the above-described holders 110, 111 arranged like a ridge and curved in a basin shape. The lines are then guided through the vertical duct 15, 15' either directly to the appliances or additionally through a horizontal duct 17 attached immediately above a console 16. Mains cables and other cables 136 for supplying the mobile workstation come out of an opening 137 of the drawer panel 138, which is dimensioned large enough for the cables to be inserted into it for transferring workstations. The drawer 133 can be opened with a tool.

Thus the vertical and horizontal ducts enable guiding of the majority of the cables and lines or tubes both in a ceiling support and in an appliance trolley and only short line ends on the appliance side are still visible.

In a further embodiment T-grooves not covered by appliance parts are closed as impermeable to liquid with inserted elastic profiles.

The invention claimed is:

1. A tubular member for a carrying device having supply lines, the member comprising a cross section having a first profile section and a second profile section positioned at an angle to the first profile section, the second profile section provides a duct for accommodating supply lines, the tubular member further comprising a cover for closing the duct and wherein the tubular member further comprising a holding device positioned inside the duct for holding and guiding the supply lines, wherein the holding device comprises at least three curved holding teeth located next to one another, and whether the cover comprises a cam and a middle tooth comprises a catching cam for engaging the cam.

2. The tubular member according to claim 1, wherein the cover is structured and arranged to be swivellably attached on one side of the second profile section.

3. The tubular member according to claim 1, wherein the cover is removable.

4. The tubular member according to claim 1, the member further comprising a first sealing edge in the second profile section and the cover comprises a second sealing edge that cooperates with the first sealing edge to provide a sealing lip.

5. A tubular member for a carrying device having supply lines, the tubular member comprising a first tubular cross section having a first profile section and a second tubular cross section comprising a second profile section positioned at an angle to the first profile section, wherein the second tubular cross section provides a duct for accommodating supply lines, the second tubular cross section further comprising a cover for dosing the duct and wherein the tubular member further comprises a groove located in the angle between the first and the second tubular cross sections, the groove facilitating the fixing of a carrying part running crosswise to the tubular member.

6. The tubular member according to claim 5, wherein the cover is removable.

7. The tubular member according to claim 5, the member further comprising a first sealing edge in the second profile section and the cover comprises a second sealing edge that cooperates with the first sealing edge to provide a sealing lip.

8. A carrying device having a first tubular member having supply lines, the first tubular member comprising a first tubular cross section having a first profile section and a second tubular cross section comprising a second profile section positioned at an angle to the first profile section, wherein the second tubular cross section provides a duct for accommodating supply lines, the second tubular cross section comprising a cover for closing the duct, the carrying device further comprising a second tubular member, spaced apart from the first tubular member, which is connected to the first tubular member by a carrying part running crosswise between the first tubular member and the second tubular member.

9. The carrying device member according to claim 8, wherein the carrying part further comprises a crosswise-running duct and a second cover swivellably attached to the crosswise-running duct.

10. The carrying device member according to claim 9, wherein the crosswise-running duct comprises a holding device for holding the supply lines.

11. The carrying device member according to claim 9, wherein the crosswise-running duct comprises a second sealing lip.

12. The tubular member according to claim 5, wherein the cover is structured and arranged to be swivellably attached on one side of the second profile section.

13. The carrying device according to claim 8, wherein the cover is structured and arranged to be swivellably attached on one side of the second profile section.

14. The carrying device according to claim 8, wherein the cover is removable.

15. The carrying device according to claim 8, the member further comprising a first sealing edge in the second profile section and the cover comprises a second sealing edge that cooperates with the first sealing edge to provide a sealing lip.

* * * * *